(12) United States Patent
Hirota

(10) Patent No.: US 8,665,315 B2
(45) Date of Patent: Mar. 4, 2014

(54) SIGNAL PROCESSING DEVICE, REPRODUCING DEVICE, SIGNAL PROCESSING METHOD AND PROGRAM

(75) Inventor: Yoichi Hirota, Kanagawa (JP)

(73) Assignee: Sony Corporation (JP)

(*) Notice: Subject to any disclaimer, the term of this patent is extended or adjusted under 35 U.S.C. 154(b) by 717 days.

(21) Appl. No.: 12/804,366

(22) Filed: Jul. 20, 2010

(65) Prior Publication Data

US 2011/0033171 A1 Feb. 10, 2011

(30) Foreign Application Priority Data

Aug. 7, 2009 (JP) ................ P2009-185054

(51) Int. Cl.
*H04N 5/14* (2006.01)
(52) U.S. Cl.
USPC .......................................................... 348/26
(58) Field of Classification Search
USPC .......................................................... 348/26
See application file for complete search history.

(56) References Cited

U.S. PATENT DOCUMENTS

| 2002/0186418 | A1* | 12/2002 | Inoue ........................... 358/3.14 |
| 2004/0247200 | A1* | 12/2004 | Hansen et al. ................ 382/274 |
| 2005/0185071 | A1* | 8/2005 | Takahashi et al. ............ 348/254 |
| 2009/0198754 | A1* | 8/2009 | Chang et al. .................. 708/319 |
| 2010/0165409 | A1 | 7/2010 | Tsukamoto et al. |

FOREIGN PATENT DOCUMENTS

| JP | 2007-221569 A | 8/2007 |
| JP | 2009-081848 A | 4/2009 |

OTHER PUBLICATIONS

Foster E J: "Panasonic DVD—A310 DVD Player", Audio Philadelphia, US, vol. 82, No. 5, May 1, 1998, XP000785593.
Wang D C C et al: "Gradient Inverse Weighted Smooting Scheme and the Evaluation of Itsperformance" Computer Graphics and Image Processing, Academic Press. New York, US, vol. 15, No. 2, Feb. 1, 1981, pp. 167-181 XP002011463.
European Search Report EP 10171041, dated Apr. 24, 2012.

* cited by examiner

*Primary Examiner* — Anner Holder
(74) *Attorney, Agent, or Firm* — Lerner, David, Littenberg, Krumholz & Mentlik, LLP

(57) ABSTRACT

There is provided a signal processing device which includes a change position detection unit that detects stepwise change positions of an n-bit quantized signal generated from an input signal; a density detection unit that calculates a value indicating a degree of density of the stepwise change positions detected by the change position detection unit; and a first low-frequency component extraction unit that extracts a desired low-frequency component from the input signal based on the value indicating the degree of density of the change positions calculated by the density detection unit.

15 Claims, 14 Drawing Sheets

<STEP DENSITY>

<REDUCED IMAGE>

<ENLARGED IMAGE: BILINEAR INTERPOLATION>

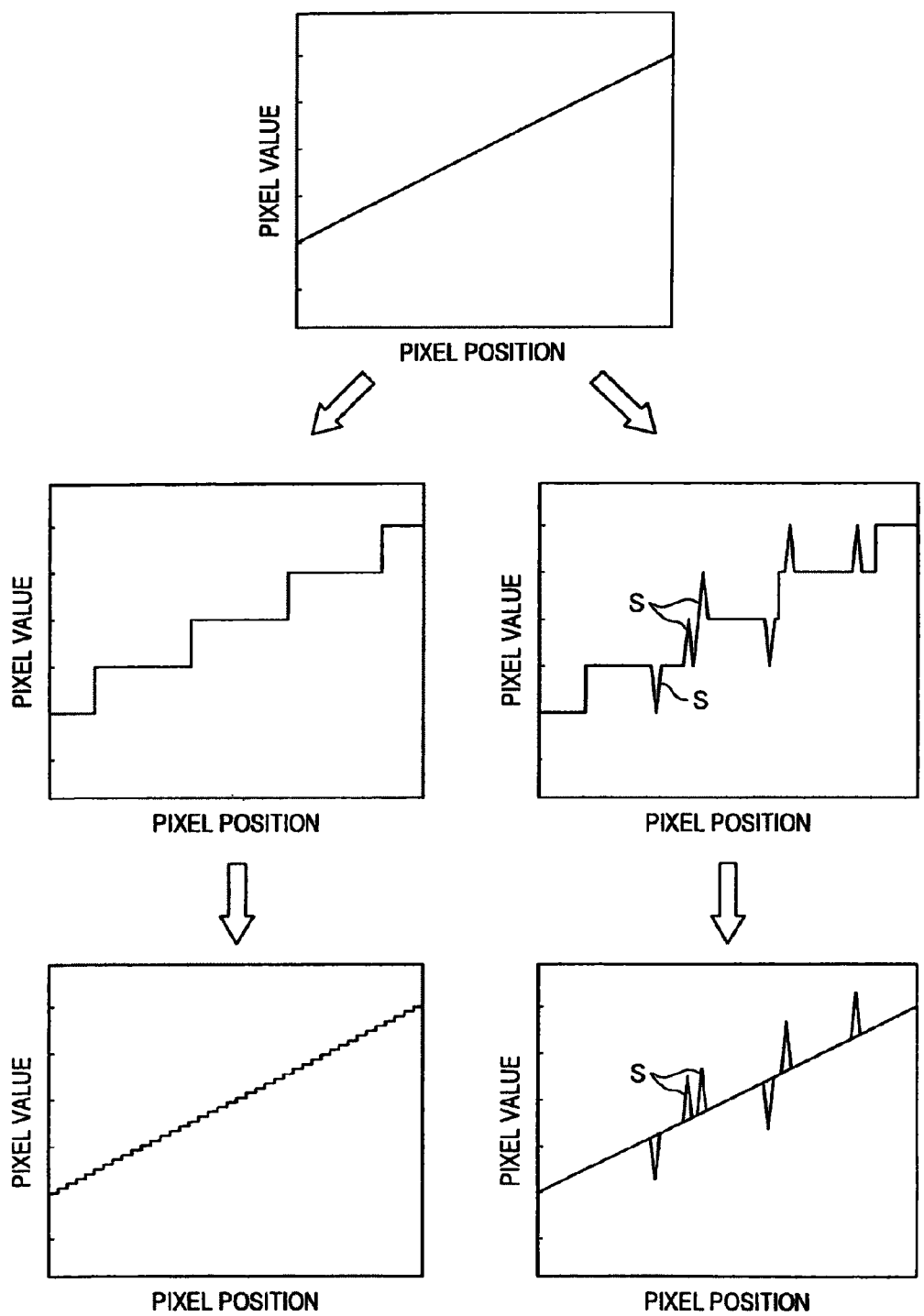

SIGNAL PROCESSING DEVICE, REPRODUCING DEVICE, SIGNAL PROCESSING METHOD AND PROGRAM

CROSS-REFERENCE TO RELATED APPLICATION

The present application claims priority from Japanese Patent Application No. JP 2009-185054 filed in the Japanese Patent Office on Aug. 7, 2009, the entire content of which is incorporated herein by reference.

BACKGROUND OF THE INVENTION

1. Field of the Invention

The present invention relates to a signal processing device, a reproducing device, a signal processing method and a program. Particularly, the present invention relates to a signal processing device, a reproducing device, a signal processing method and a program that remove noise contained in a quantized signal.

2. Description of the Related Art

When a video signal that spatially varies very gently as shown in the upper middle of FIG. 19 is quantized, a generated digital video signal has a step-like waveform as shown in the middle left of FIG. 19, and a false contour is thereby generated. Specifically, a video signal, which is originally smooth, is changed into a step-like waveform, and a streak pattern like a contour line appears in the image. The streak pattern is called a false contour.

In view of this, the technique that eliminates the false contour by detecting a region where the false contour is generated and extending the bit length so as to smooth the signal as shown in the lower left of FIG. 19 has been proposed (cf. e.g. Japanese Unexamined Patent Application Publication No. 2007-221569).

Incidentally, digital signals of actual digital video contents in digital broadcasting or reproduced by DVD (Digital Versatile Disc), BD-ROM (Blu-ray Disc-ROM) or the like mostly have a waveform with an irregular step-like pattern as shown in the middle right of FIG. 19. This is because the step-like portion of the waveform is disturbed by noise S (which is also referred to hereinafter as false contour noise S) in the process of creating or compressing the contents.

SUMMARY OF THE INVENTION

When the false contour noise S is contained in the quantized step-like video signal, the false contour noise S remains in spite of the bit extension processing as shown in the lower right of FIG. 19. The false contour noise S is perceived as a false contour by the human eye. In this manner, the step-like waveform is not accurately identifiable when the false contour noise S is contained in the video signal. It is therefore difficult for the false contour removal technique according to related art to accurately detect and remove the false contour containing the false contour noise S.

In light of the foregoing, it is desirable to provide a novel and improved signal processing device, reproducing device, signal processing method and program that can detect and remove a false contour such as false contour noise.

According to an embodiment of the present invention, there is provided a signal processing device which includes a change position detection unit that detects stepwise change positions of an n-bit quantized signal generated from an input signal; a density detection unit that calculates a value indicating a degree of density of the stepwise change positions detected by the change position detection unit; and a first low-frequency component extraction unit that extracts a desired low-frequency component from the input signal based on the value indicating the degree of density of the change positions calculated by the density detection unit.

It is thereby possible to accurately detect the false contour based on the value indicating the degree of density of the stepwise change positions. Further, based on the false contour detection result, it is possible to generate a signal with less blurring of an image and from which the false contour is effectively removed.

The signal processing device further may include a low-pass filter with a variable number of taps, and the first low-frequency component extraction unit may change the low-frequency component of the input signal to be extracted through the low-pass filter by varying the number of taps according to the value indicating the degree of density of the change positions.

The signal processing device further may include a second low-frequency component extraction unit that extracts a low-frequency component of the input signal; and a first gray level conversion unit that generates the n-bit quantized signal from the input signal by converting a gray level of the low-frequency component of the input signal extracted by the second low-frequency component extraction unit, and the change position detection unit may detect stepwise change positions of the n-bit quantized signal generated by the first gray level conversion unit.

The density detection unit may calculate a bandwidth being an interval between the change positions as the value indicating the degree of density of the change positions.

The signal processing device further may include a second gray level conversion unit that converts a gray level of the input signal from which the low-frequency component is extracted by the first low-frequency component extraction unit to a lower level with use of SBM (Super Bit Mapping).

The density detection unit may calculate a step density as the value indicating the degree of density of the change positions.

The signal processing device further may include a gain calculation unit that calculates a gain g based on the step density calculated by the density detection unit, and the first low-frequency component extraction unit may apply the gain g calculated by the gain calculation unit for weighting to the low-frequency component of the input signal.

The first low-frequency component extraction unit may apply a value obtained by subtracting the gain g from 1 (1−g) for weighting to the input signal and may add the weighted input signal to the low-frequency component of the input signal weighted by the gain g.

The signal processing device further may include a gain calculation unit that calculates a gain g based on the step density calculated by the density detection unit; a reduced image creation unit that creates a reduced image by reducing an original image created from the input signal; and an enlarged image creation unit that creates an enlarged image by enlarging the reduced image created by the reduced image creation unit, and the first low-frequency component extraction unit may apply the gain g calculated by the gain calculation unit for weighting to a signal forming the enlarged image.

The first low-frequency component extraction unit may apply the gain g for weighting to the enlarged image and may apply a weight (1−g) for weighting to the original image, and adds up the weighted enlarged image and the weighted original image.

The enlarged image creation unit may create the enlarged image from the reduced image of previous one frame created by the reduced image creation unit.

The signal processing device further may include a gain correction unit that calculates a correction value G of the gain g from a difference between the original image and the enlarged image, and the first low-frequency component extraction unit corrects the gain g based on the correction value G calculated by the gain correction unit.

According to another embodiment of the present invention, there is provided a reproducing device which includes a change position detection unit that detects stepwise change positions of an n-bit quantized signal generated from an input signal; a density detection unit that calculates a value indicating a degree of density of the stepwise change positions detected by the change position detection unit; a first low-frequency component extraction unit that extracts a signal having a desired low-frequency component from the input signal based on the value indicating the degree of density of the change positions calculated by the density detection unit; and a reproducing unit that reproduces the signal having the desired low-frequency component extracted by the first low-frequency component extraction unit.

According to another embodiment of the present invention, there is provided a signal processing method which includes the steps of: a change position detection unit that detects stepwise change positions of an n-bit quantized signal generated from an input signal; a density detection unit that calculates a value indicating a degree of density of the stepwise change positions detected by the change position detection unit; a first low-frequency component extraction unit that extracts a signal having a desired low-frequency component from the input signal based on the value indicating the degree of density of the change positions calculated by the density detection unit; and a reproducing unit that reproduces the signal having the desired low-frequency component extracted by the first low-frequency component extraction unit.

According to another embodiment of the present invention, there is provided a program causing a computer to execute a process which includes change position detection processing that detects stepwise change positions of an n-bit quantized signal generated from an input signal; density detection processing that calculates a value indicating a degree of density of the stepwise change positions detected by the change position detection processing; and first low-frequency component extraction processing that extracts a desired low-frequency component from the input signal based on the value indicating the degree of density of the change positions calculated by the density detection processing.

According to the embodiments of the present invention described above, it is possible to accurately detect and remove a false contour such as false contour noise.

BRIEF DESCRIPTION OF THE DRAWINGS

FIG. 19 is a typical view to describe generation of false contour noise.

DETAILED DESCRIPTION OF THE EMBODIMENT(S)

Figure 1:
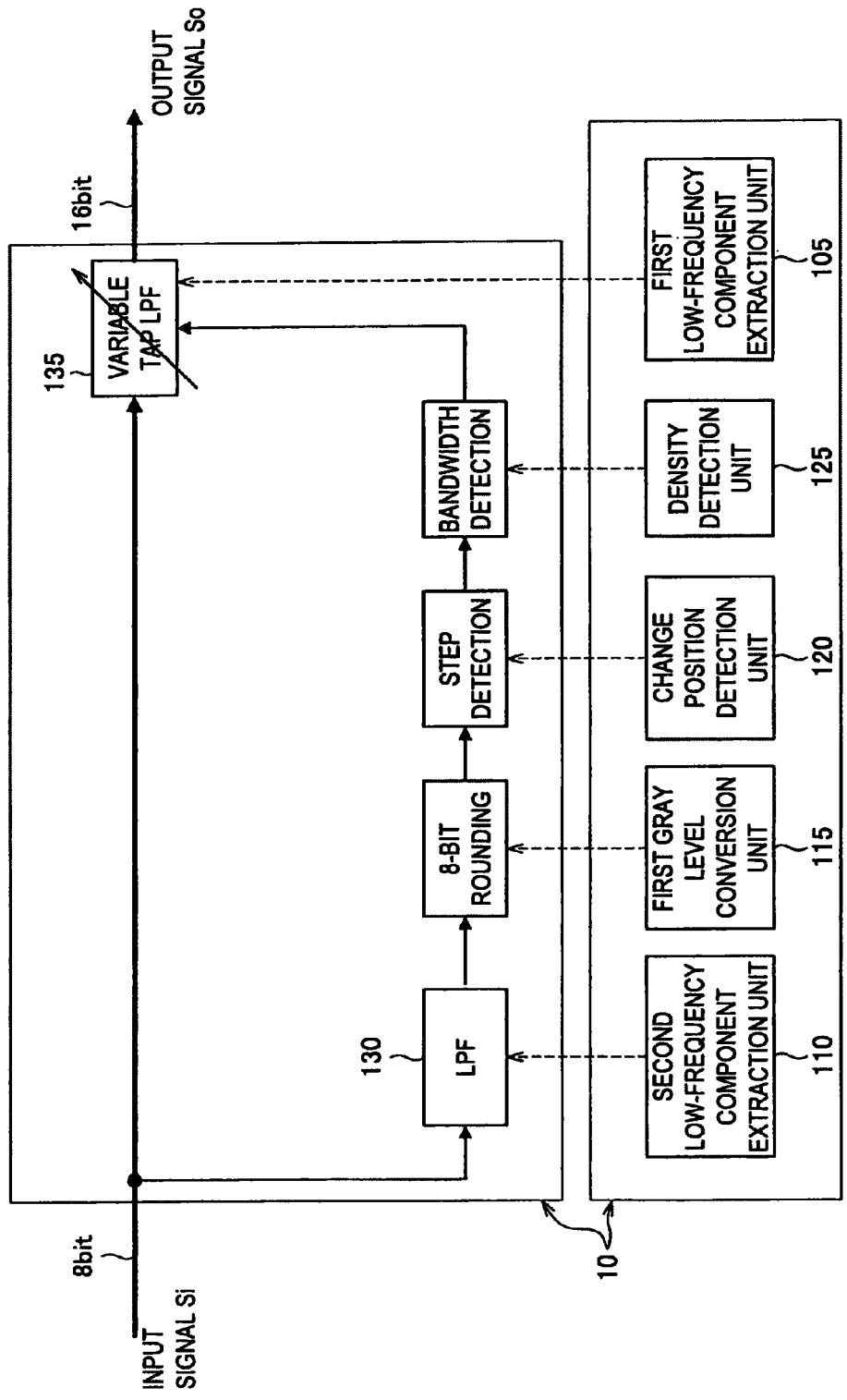
FIG. 1 is a view showing a functional configuration and an operation of a signal processing device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<Introduction>
[Generation of False Contour (False Contour Noise)]
<First Embodiment>
[Functional Configuration of Signal Processing Device and Signal Processing Method]
[False Contour Removal Effect]
<Second Embodiment>
[Functional Configuration of Signal Processing Device and Signal Processing Method]
<Third Embodiment>
[Functional Configuration of Signal Processing Device and Signal Processing Method]
<Fourth Embodiment>
[Functional Configuration of Signal Processing Device and Signal Processing Method]
<Fifth Embodiment>

[Functional Configuration of Signal Processing Device and Signal Processing Method]
<Sixth Embodiment>
[Functional Configuration of Signal Processing Device and Signal Processing Method]

Introduction

Generation of False Contour (False Contour Noise)

To begin with, generation of a false contour such as false contour noise that is generated in a video signal or the like is briefly described. As described earlier, a digital video signal is quantized into a stepwise (step-like) shape as shown in the middle left of FIG. 19. The bit length of a digital video signal is generally restricted to about 8 bits for the purpose of preventing an increase in hardware size of a device to record or reproduce the video or in consideration of a limited communication band of the digital video signal or the like. Further, because an upper limit of the number of bits at which a difference in 1 LSB (Least Significant Bit), namely, a difference in one level (dynamic range/256 gray levels) of a video signal, is unperceivable by the human is 8 bits when displaying a digital video signal on a screen of a television or the like, if the digital video signal is 8 bits, degradation of the video is unnoticeable and therefore efficient transmission of the digital video signal is possible. Thus, video contents of digital broadcasting, Blu-ray, DVD, JPEG (Joint Photographic Experts Group) or the like are generally quantized into 8 bits and recorded as data that can display the maximum 256 gray levels.

Although digital video signals quantized into 10 bits exist in professional applications, some of them are substantially 8 bits since 0 is embedded in the lower-order 2 bits of the 10 bits in the process of creating contents.

Originally, when the image expressed by the analog video signal shown in the upper middle of FIG. 19 is quantized as shown in the middle left of FIG. 19, quantization steps appear as stepped streaks such as contours on the image expressed by the quantized digital video signal.

The streak pattern is called a false contour or banding, and various design ideas are applied to remove the false contour because it causes degradation of image quality. As techniques to remove the false contour, a false contour noise removal technique, a band removal technique and so on have been proposed in addition to the bit extension technique shown in the lower left of FIG. 19. However, the false contour that appears in actual digital video contents does not have a regular step-like pattern as shown in the middle right of FIG. 19, and it is disturbed by the false contour noise S. In such a case, the false contour noise S remains in spite of the bit extension processing as shown in the lower right of FIG. 19, and the remaining false contour noise S is perceived as a false contour by the human eye.

In view of the foregoing, a technique that accurately detects such a false contour by applying various kinds of low-pass filters and rounding to a digital video signal is described in signal processing according to the below-described embodiments. Further, a technique that generates a smooth signal with no blurring at the edge of a target in an image as well as cleanly removing the false contour with use of the above detection result is described. In the following description, the term "false contour" involves false contour noise.

First Embodiment

First, a signal processing device according to a first embodiment of the present invention is described hereinafter with reference to the functional configuration of the signal processing device shown in the lower part of FIG. 1 and the signal processing method shown in the upper part of FIG. 1. Note that an input signal Si is input to a signal processing device 10, and it is output as an output signal So after prescribed signal processing. The output signal So is reproduced in a reproducing device such as a DVD device or a Blu-ray device.

[Functional Configuration of Signal Processing Device and Signal Processing Method]

The signal processing device 10 according to the first embodiment has functions indicated by the functional blocks of a first low-frequency component extraction unit 105, a second low-frequency component extraction unit 110, a first gray level conversion unit 115, a change position detection unit 120, and a density detection unit 125.

Commands to the respective units described above are executed by a dedicated control device or a CPU, which is not shown, that executes a program. The program for executing signal processing is prestored in ROM, nonvolatile memory or the like, which is also not shown, and the CPU reads and executes each program from such memory to thereby implement the functions of the first low-frequency component extraction unit 105, the second low-frequency component extraction unit 110, the first gray level conversion unit 115, the change position detection unit 120 and the density detection unit 125. The function of the first low-frequency component extraction unit 105 is implemented by using a low-pass filter (LPF) 130. The function of the second low-frequency component extraction unit 110 is implemented by using a variable tap low-pass filter (LPF) 135. Note that the low-pass filter 130 is a low pass filter with a fixed number of taps, and the variable tap low-pass filter 135 is a low pass filter with a variable number of taps.

Figure 2:
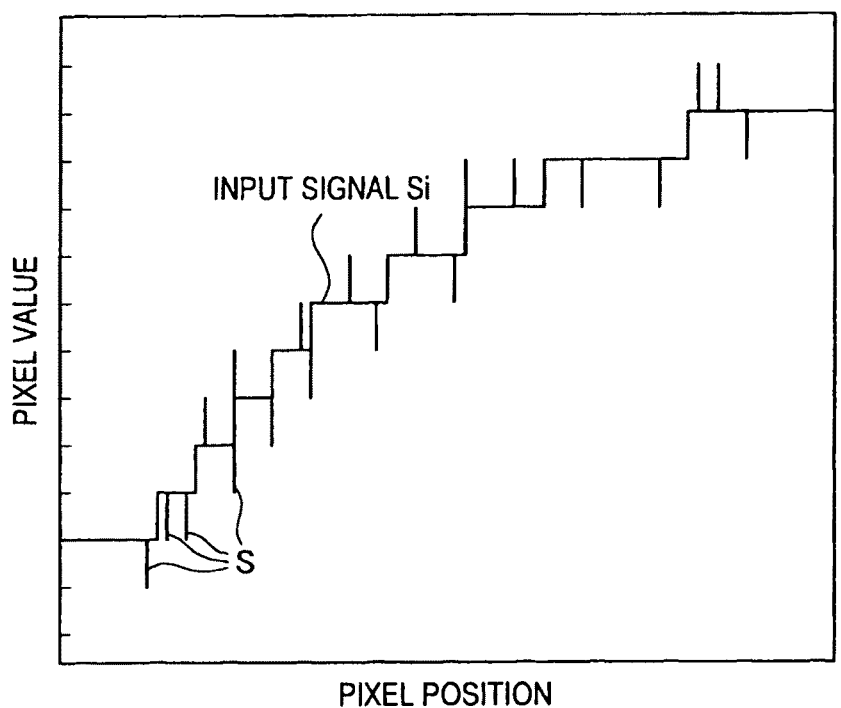
FIG. 2 shows an example of an input signal Si to be processed by the signal processing device according to the first embodiment.

The second low-frequency component extraction unit 110 filters the input signal Si through the low-pass filter 130. This is described hereinafter taking the 8-bit input signal Si containing the false contour noise S shown in FIG. 2 as an example. In this example, the low-pass filter 130 is a low-pass filter whose number of taps is fixed to 3 to 7. The second low-frequency component extraction unit 110 applies the low-pass filter 130 to the input signal Si, which is a digital video signal of 8 bits, and thereby obtains a signal Sc of 9 bits or more (512 gray levels or more).

Figure 3:
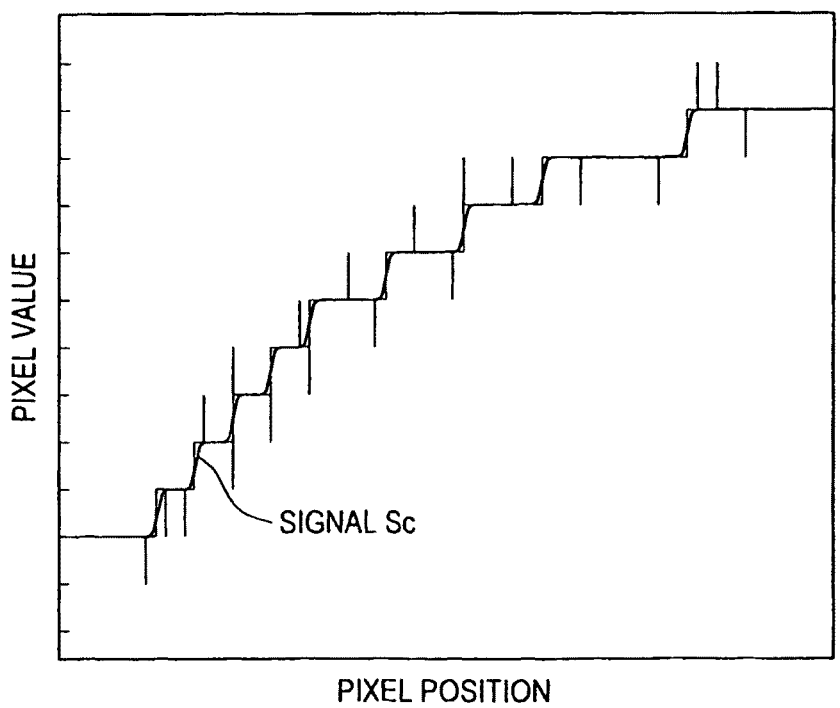
FIG. 3 shows a signal Sc after the input signal Si passes through a fixed tap low-pass filter in the first embodiment.

In this manner, the second low-frequency component extraction unit 110 removes a high-frequency component contained in the input signal Si and extracts a low-frequency component. Because the false contour noise S is the high-frequency component of the input signal Si, the false contour noise S is removed by the function of the second low-frequency component extraction unit 110, and the signal Sc, which is the low-frequency component of the input signal Si, is extracted as shown in FIG. 3.

Naturally, the height of steps is smaller in the extracted 9-bit signal Sc than in the 8-bit input signal Si. By performing the bit extension of the 8-bit signal, it is possible to "level down" the 8-bit steps and generate a smooth signal such as 9 bits, 10 bits, 12 bits or 16 bits.

Although the second low-frequency component extraction unit 110 extracts the low-frequency component of the input signal Si by the bit extension using the low-pass filter 130 in this embodiment, it is not limited thereto, and the second low-frequency component extraction unit 110 may use the bit extension technique disclosed in Japanese Unexamined Patent Application Publication No. 2007-221569, for example. Further, the bit extension and the high-frequency component removal may be performed by using the false contour noise removal technique, the band removal technique or the like.

Figure 4:
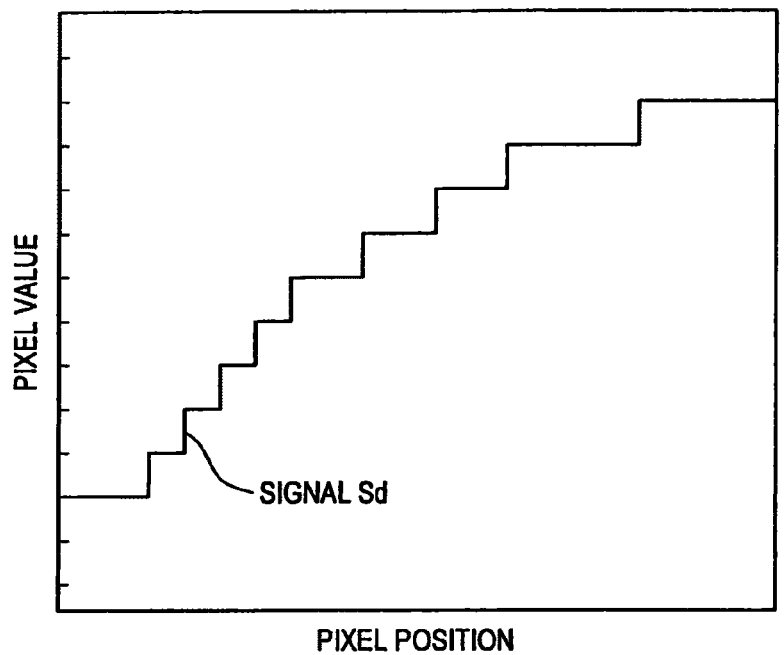
FIG. 4 is a signal Sd after the signal Sc is rounded to 8 bits in the first embodiment.

The first gray level conversion unit 115 converts the gray level of the signal Sc, which is the low-frequency component of the input signal Si, extracted by the second low-frequency component extraction unit 110 to thereby generate an n-bit quantized signal. In this embodiment, the first gray level conversion unit 115 rounds off the 9-bit signal Sc and thereby generates an 8-bit signal Sd representing 256 gray levels (cf. "8-bit rounding" in FIG. 1 and FIG. 4). However, the first gray level conversion unit 115 does not necessarily generate the 8-bit signal and may generate a signal of another number of bits.

The change position detection unit 120 detects stepwise change positions of the n-bit quantized signal generated by the first gray level conversion unit 115 ("step detection" in FIG. 1). In this embodiment, the change position detection unit 120 detects the positions at which the 8-bit signal Sd changes step-like by 1 LSB (Least Significant Bit).

Figure 5:
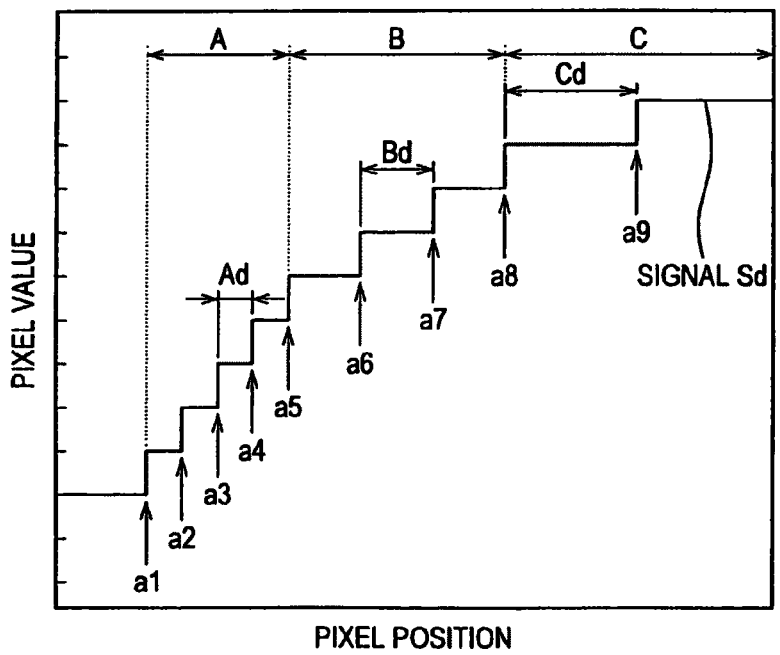
FIG. 5 is a view to describe detection of stepwise change positions of the signal Sd in the first embodiment.

An example of detecting the stepwise change positions is described hereinbelow. It is assumed, for example, that a part in which a difference dif from an adjacent pixel satisfies dif(p)=±1, dif(p−1)=0 and dif(p+1)=0 is a step region (stepwise change position), and a part in which the difference dif satisfies dif(p)=0, dif(p−1)=0 and dif(p+1)=0 is a flat region. As a result, the stepwise change positions a1, a2, a3, a4, a5, a6, a7, a8 and a9 are detected in the pixel position shown in FIG. 5.

Figure 6:
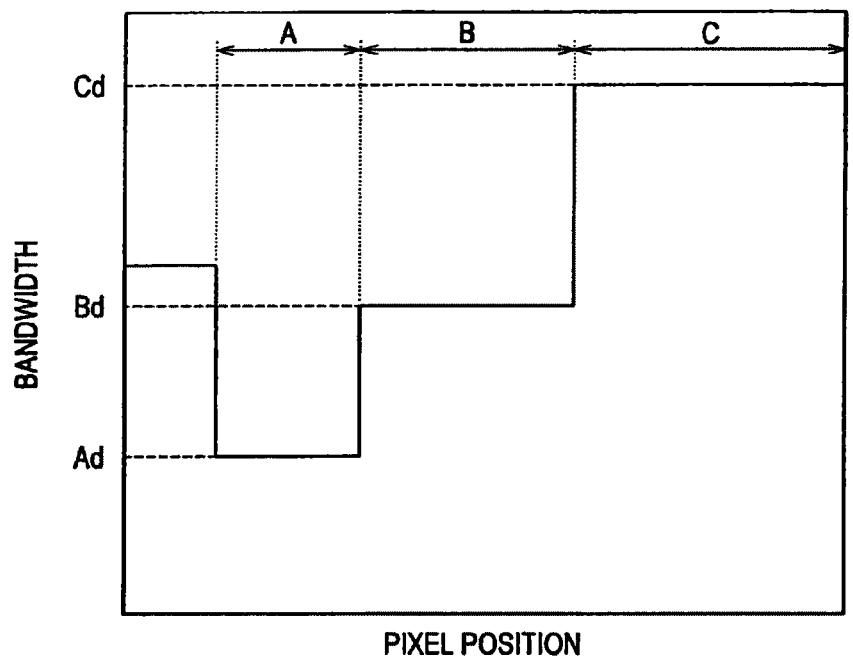
FIG. 6 is a view showing a calculation result of a bandwidth between stepwise change positions of the signal Sd in the first embodiment.

The density detection unit 125 calculates a value indicating the degree of density of the stepwise change positions detected by the change position detection unit 120. In this embodiment, the density detection unit 125 calculates a bandwidth, which is the interval between change positions, as the value indicating the degree of density of change positions. Calculating the bandwidth corresponds to measuring the width of the false contour. In the example of the signal Sd shown in FIG. 5, the bandwidth Ad is small in the range A, the bandwidth Cd is large in the range C, and the bandwidth Bd is intermediate in the range B. Accordingly, the bandwidth calculated by the density detection unit 125 is small in the range A, large in the range C and intermediate in the range B as shown in FIG. 6.

The first low-frequency component extraction unit 105 extracts a desired low-frequency component from the input signal Si based on the bandwidths calculated by the density detection unit 125. Specifically, the first low-frequency component extraction unit 105 changes the characteristics of the low-frequency component of the input signal Si to be extracted through the variable tap low-pass filter 135 by changing the number of taps according to the bandwidths calculated by the density detection unit 125 and thereby generates the output signal So.

For example, a small number of taps is set in the range A because the bandwidth Ad is small. This suppresses blurring of the image. Further, a large number of taps is set in the range C because the bandwidth Cd is large. This suppresses blurring of an image. This suppresses that the step portion of the signal, which is the false contour of the image, appears as it remains.

[False Contour Removal Effect]

Figure 7:
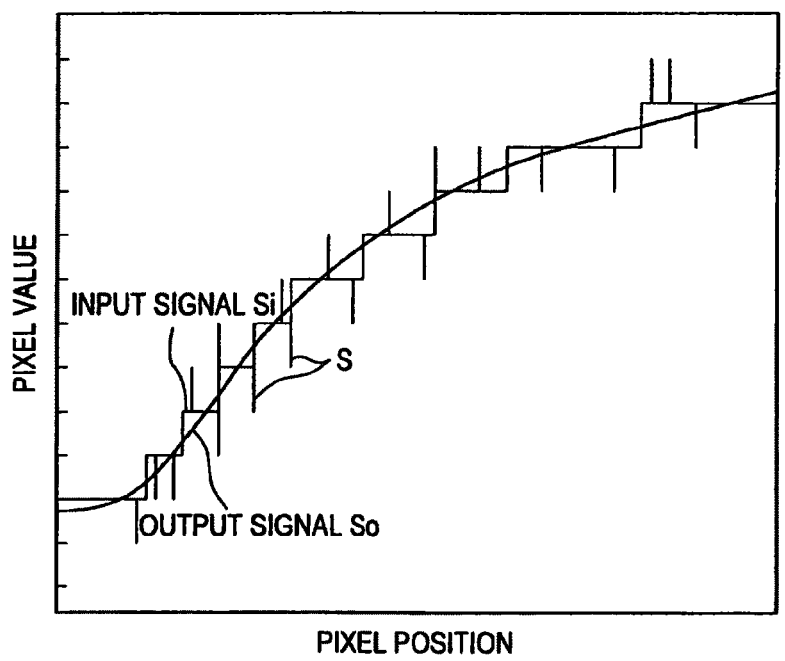
FIG. 7 is a view showing a processing result by the signal processing device according to the first embodiment.

As described above, in the signal processing device 10 according to the embodiment, the input signal Si is filtered through the variable tap low-pass filter 135 with the number of taps corresponding to the interval between steps, and it is thereby possible to remove the false contour containing the false contour noise S from the 8-bit input signal Si containing the false contour noise S as shown in FIG. 7 and obtain the 16-bit output signal So which is smooth but not too blurry. Because the output signal So is a video signal in this embodiment, it is extended to a two-dimensional model for use in practice. The output signal So is reproduced by a Blu-ray device or the like.

Figure 8:
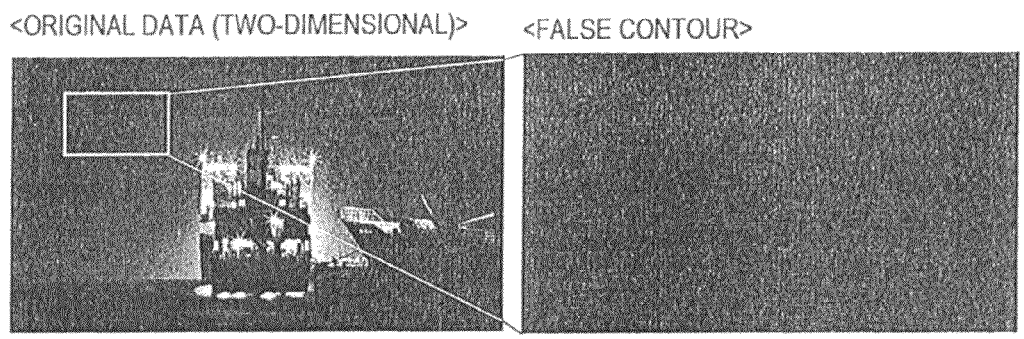
FIG. 8 shows an example of two-dimensional original data to be processed by the signal processing device according to the first embodiment.
Figure 9:
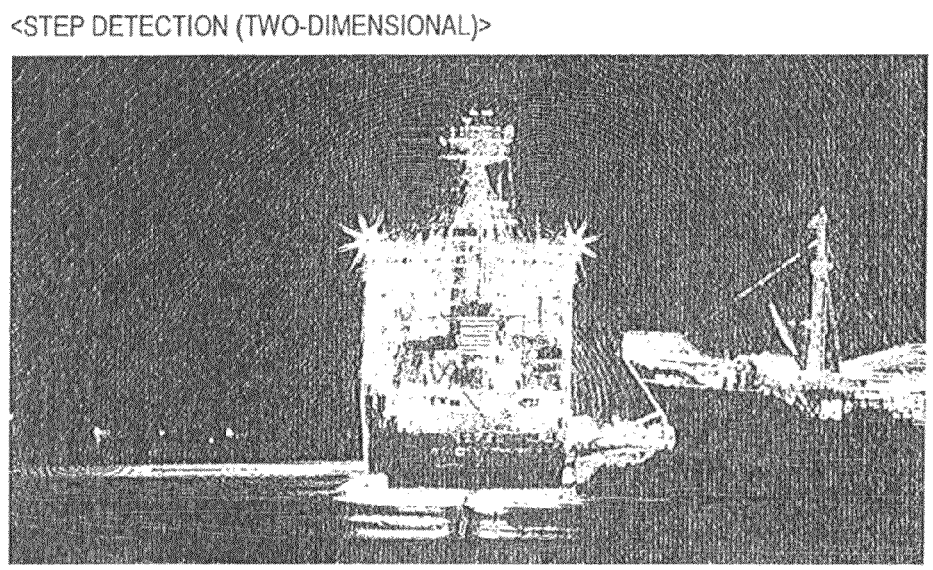
FIG. 9 is a view showing a step detection result by the signal processing device according to the first embodiment.

Two-dimensional original data to be processed by the signal processing device 10 according to the embodiment is shown as an example on the left of FIG. 8. Further, an image showing a part of the background of the original data in an enlarged scale is shown on the right of FIG. 8. The enlarged image shows that a false contour in a streak pattern is generated in the original data. The original data is filtered through the low-pass filter 130 shown in FIG. 1 and rounded into 8 bits, and then steps are detected and bandwidths are calculated as described earlier. FIG. 9 shows a result of detecting the steps. The black part of FIG. 9 indicates the flat region, the gray part (linear streak pattern) indicates the stepwise change position, and the white part indicates the other image region.

Figure 10:
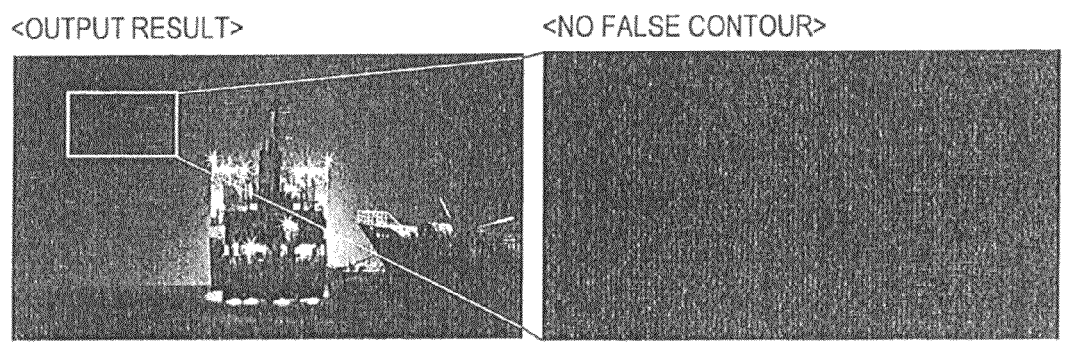
FIG. 10 is a view showing a processing result of original data by the signal processing device according to the first embodiment.

FIG. 10 shows a result of filtering the original data through the variable tap low-pass filter 135 whose number of taps is set corresponding to the bandwidth. The false contour does not appear in the enlarged view on the right of FIG. 10. Therefore, the signal processing device 10 according to the embodiment can accurately remove the false contour containing the false contour noise S.

Particularly, in the signal processing device 10 according to the embodiment, the low-pass filter 130 and the rounding are applied to the video signal, thereby accurately detecting the false contour. Further, the number of taps is changed as appropriate by the step detection and the bandwidth calculation, thereby optimizing the characteristics of the variable tap low-pass filter 135 according to the degree of change in the signal. As a result, it is possible to generate a smooth signal with less blurring, from which only the false contour is removed cleanly.

Second Embodiment

Figure 11:
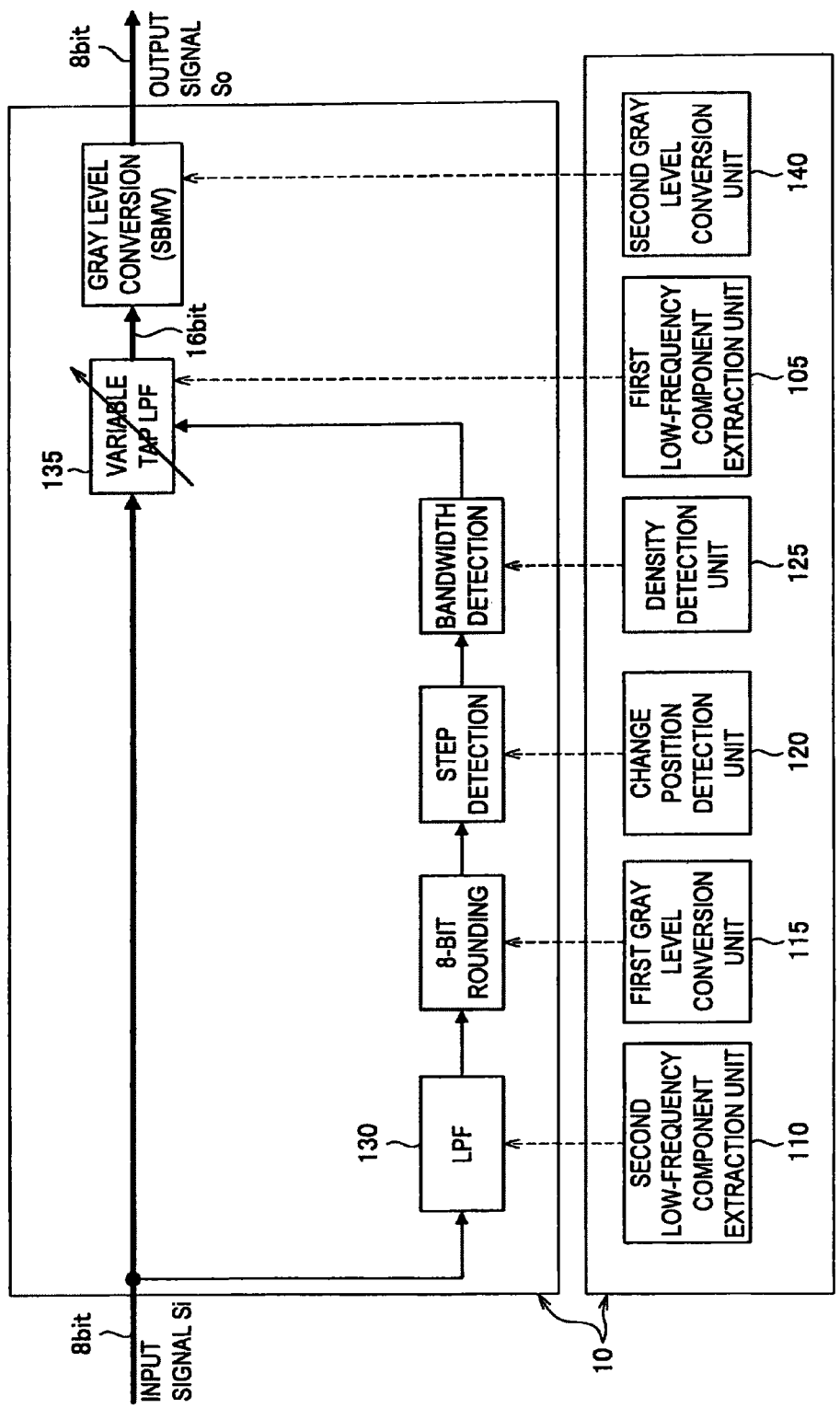
FIG. 11 is a view showing a functional configuration and an operation of a signal processing device according to a second embodiment of the present invention.

A signal processing device according to a second embodiment of the present invention is described hereinafter with reference to the functional configuration of the signal processing device shown in the lower part of FIG. 11 and the signal processing method shown in the upper part of FIG. 11.

[Functional Configuration of Signal Processing Device and Signal Processing Method]

The signal processing device 10 according to the second embodiment has a function indicated by the functional block of a second gray level conversion unit 140 in addition to the functional blocks of the first low-frequency component extraction unit 105, the second low-frequency component extraction unit 110, the first gray level conversion unit 115, the change position detection unit 120, and the density detection unit 125. In this embodiment also, a CPU, not shown, reads and executes each program from memory, not shown, to thereby implement the functions of the first low-frequency component extraction unit 105, the second low-frequency component extraction unit 110, the first gray level conversion unit 115, the change position detection unit 120, the density detection unit 125, and the second gray level conversion unit 140.

In the second embodiment, gray level conversion processing by the second gray level conversion unit 140 is additionally performed on the 16-bit signal that is generated by the signal processing in the first embodiment, and an 8-bit output signal So is thereby generated.

Specifically, the second gray level conversion unit 140 converts the gray level of the input signal from which the low-frequency component is extracted by the first low-frequency component extraction unit 105 to a lower level with use of SBM (Super Bit Mapping). In this embodiment, SBMV (Super Bit Mapping for Video) disclosed in Japanese Unexamined Patent Application No. 2009-81848, for example, may be used as the SBM technology. The SBM technology modulates a quantization error generated at the time of gray level conversion into a high frequency range which is not likely to be perceived by the human and thereby expresses gray levels in a pseudo manner.

The signal processing device 10 according to the embodiment uses the signal processing method according to the first embodiment and the gray level conversion technique of SBM in combination. It is thereby possible to convert the image data whose number of gray levels is reduced by quantization into image data having image quality that is visually close to the image quality when the number of gray levels is larger and reproduce it. Therefore, it is possible to remove the false contour when outputting the 8-bit signal also. For example, the false contour can be effectively removed in the case of outputting 8-bit video contents to a monitor that is not compatible with deep color mode. Further, the false contour can be effectively removed in the case of authoring the original source produced at 8-bit accuracy to 8-bit video contents.

However, the gray level conversion technique that is implemented by the second gray level conversion unit 140 according to this embodiment is not limited to SBM, and a gray level may be converted by the same way as the first gray level conversion unit 115 according to the first embodiment.

Third Embodiment

Figure 12:
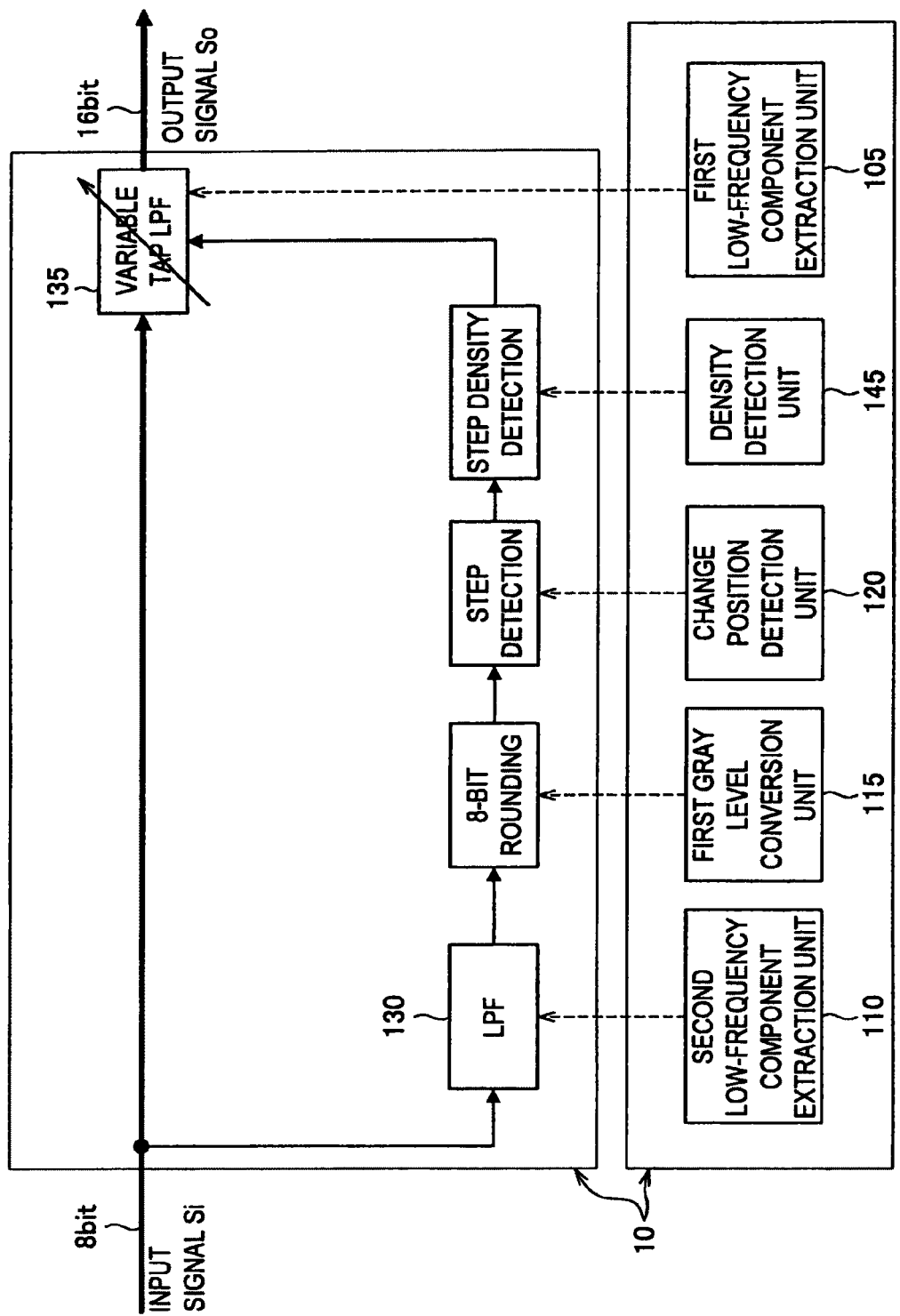
FIG. 12 is a view showing a functional configuration and an operation of a signal processing device according to a third embodiment of the present invention.

A signal processing device according to a third embodiment of the present invention is described hereinafter with reference to the functional configuration of the signal processing device shown in the lower part of FIG. 12 and the signal processing method shown in the upper part of FIG. 12.
[Functional Configuration of Signal Processing Device and Signal Processing Method]

The signal processing device 10 according to the third embodiment has functions indicated by the functional blocks of the first low-frequency component extraction unit 105, the second low-frequency component extraction unit 110, the first gray level conversion unit 115, the change position detection unit 120, and a density detection unit 145, like the signal processing device 10 according to the first embodiment. In this embodiment also, a CPU, not shown, reads and executes each program from memory, not shown, to thereby implement the functions of the first low-frequency component extraction unit 105, the second low-frequency component extraction unit 110, the first gray level conversion unit 115, the change position detection unit 120, and the density detection unit 145.

The functions of the second low-frequency component extraction unit 110, the first gray level conversion unit 115 and the change position detection unit 120 according to this embodiment are the same as those of the first embodiment.

On the other hand, while the density detection unit 125 according to the first embodiment calculates the bandwidth as a value indicating the degree of density of change positions, the density detection unit 145 according to this embodiment calculates a step density as a value indicating the degree of density of change positions. For example, the step density is high in the range A shown in FIG. 5, the step density is low in the range C, and the step density is intermediate in the range B.

Figure 13:
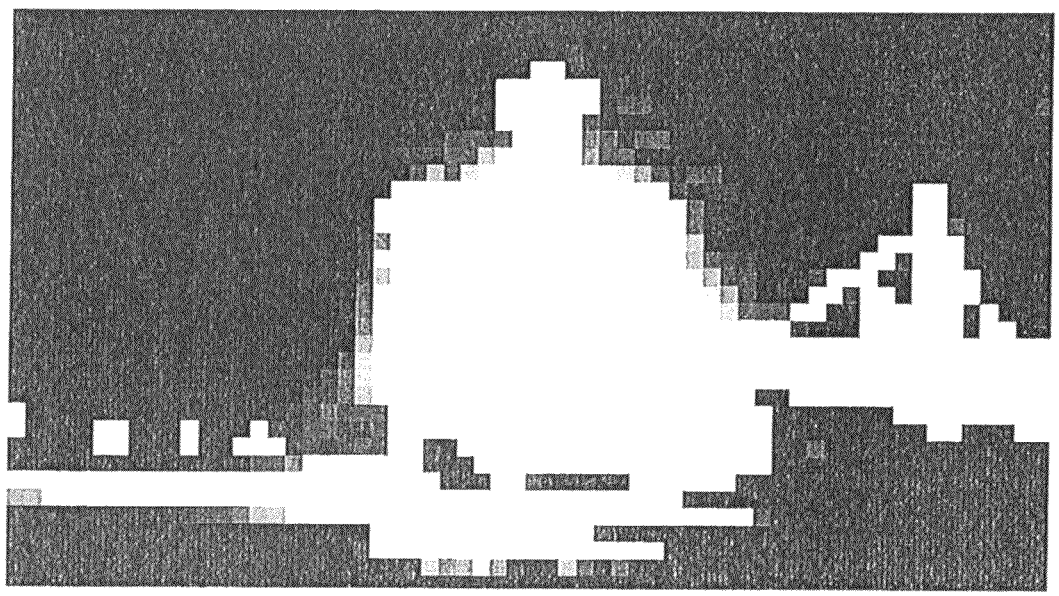
FIG. 13 is a view showing an example of a step density calculated by the signal processing device according to the third embodiment.

In this manner, the density detection unit 145 according to the embodiment obtains the step density distribution shown in FIG. 13, for example, based on the degree of density of change positions. In practice, the density detection unit 145 calculates the step density by counting the number of white pixels in the image indicating the step density in FIG. 13. The step density is higher as the count value is larger. Thus, in FIG. 13, the step density is higher as the white part is larger, and the step density is lower as the black part is larger.

The first low-frequency component extraction unit 105 extracts a desired low-frequency component from the input signal Si based on the step density calculated by the density detection unit 145. For example, the first low-frequency component extraction unit 105 may apply a low-pass filter when the step density is lower than a predetermined threshold. In this case, the number of taps of the low-pass filter may be fixed, not variable. The input signal in the black part of FIG. 13 is thereby filtered through the low-pass filter. As a result, the false contour of the output signal So forming the background (black part) of FIG. 13 is effectively removed, so that the smooth output signal So is obtained.

On the other hand, because the step density is higher than the predetermined threshold in the white part of FIG. 13, the first low-frequency component extraction unit 105 does not filter the input signal in the white part of FIG. 13 through the low-pass filter. The high-frequency component of the image in the white part of FIG. 13 is thereby not removed and the image remains as it is. In this manner, it is possible in this embodiment to clearly display the image of a target in the white part of FIG. 13 and effectively remove only the false contour at the background in the black part of FIG. 13.

As described above, according to the embodiment, it is possible to generate a smooth signal with less blurring of a target in the image and from which the false contour in the background or the like is cleanly removed. Particularly, it is not necessary to measure the bandwidth with respect to each pixel in this embodiment, thereby eliminating the need for high capacity memory to store the pixels corresponding to the width of the false contour and reducing processing load.

Note that the first low-frequency component extraction unit 105 may filter the input signal Si through the variable tap low-pass filter 135 by setting a small number of taps in the white part of FIG. 13 because the step density is high and setting a large number of taps in the black part of FIG. 13 because the step density is low. The steeper output signal So is thereby generated in the white part where the edge of the target should be more clearly defined, and the smoother output signal So is generated in the black part on the background where the false contour of the image should be removed. It is thereby also possible to effectively remove the false contour in the background while offering the clear picture of the target.

Fourth Embodiment

Figure 14:
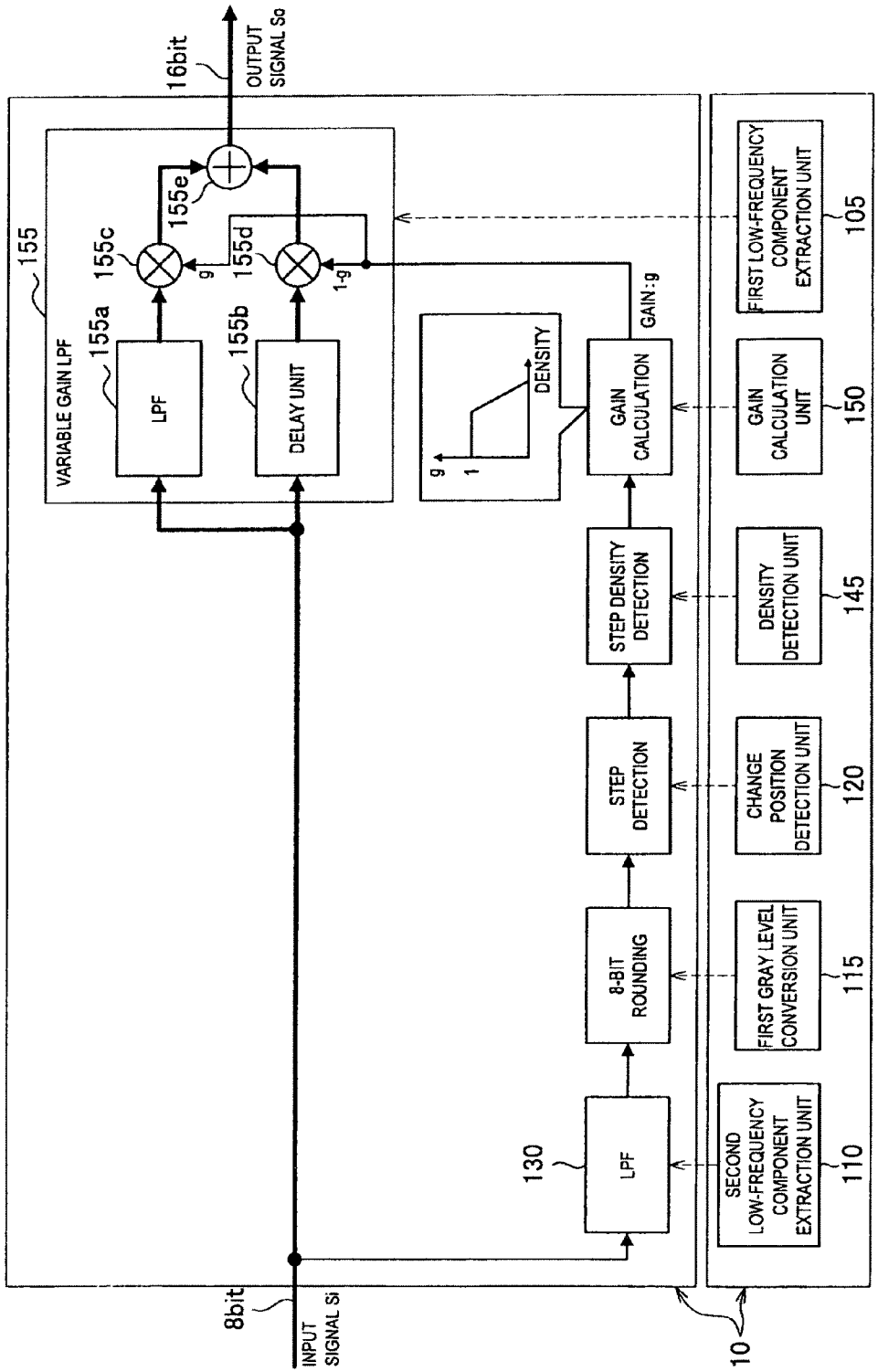
FIG. 14 is a view showing a functional configuration and an operation of a signal processing device according to a fourth embodiment of the present invention.

A signal processing device according to a fourth embodiment of the present invention is described hereinafter with reference to the functional configuration of the signal processing device shown in the lower part of FIG. 14 and the signal processing method shown in the upper part of FIG. 14.
[Functional Configuration of Signal Processing Device and Signal Processing Method]

The signal processing device 10 according to the fourth embodiment has functions indicated by the functional blocks of the first low-frequency component extraction unit 105, the second low-frequency component extraction unit 110, the first gray level conversion unit 115, the change position detection unit 120, the density detection unit 145 and a gain calculation unit 150. In this embodiment also, a CPU, not shown, reads and executes each program from memory, not shown, to thereby implement the functions of the first low-frequency component extraction unit 105, the second low-frequency component extraction unit 110, the first gray level conversion unit 115, the change position detection unit 120, the density detection unit 145, and the gain calculation unit 150.

The gain calculation unit 150 calculates a gain g based on the step density calculated by the density detection unit 145. Specifically, the gain calculation unit 150 sets the gain g to 1 when the step density is smaller than a predetermined threshold and sets the gain g to a value smaller than 1 when the step density becomes higher than the predetermined threshold, as shown in the graph of FIG. 14. The gain g is set closer to 0 as the step density becomes higher.

The first low-frequency component extraction unit 105 applies the gain g calculated by the gain calculation unit 150 for weighting to the low-frequency component of the input signal Si by using a variable gain low-pass filter 155. The variable gain low-pass filter 155 includes a low-pass filter (LPF) 155$a$, a delay unit 155$b$, a multiplier 155$c$, a multiplier 155$d$ and an adder 155$e$.

The low-pass filter 155$a$ has a fixed number of taps, and it removes a high-frequency component from the input signal Si and extracts a low-frequency component. The delay unit 155$b$ delays the output of the input signal Si by the length of a processing time of the low-pass filter 155$a$. The multiplier 155$c$ multiplies the low-frequency component of the input signal extracted through the low-pass filter 155$a$ by the gain g. The multiplier 155$d$ multiplies the input signal Si output with a delay from the delay unit 155$b$ by a value obtained by subtracting the gain g from 1 (1−g). Finally, the adder 155$e$ adds up the signals respectively weighted by the multipliers 155$c$ and 155$d$ and thereby generates the output signal So.

As described above, the signal processing method according to the embodiment multiplies the low-frequency component of the input signal Si by the weight of the gain g and further multiplies the input signal Si by the weight (1−g) to thereby adjust the proportion of the low-frequency component in the input signal Si. Specifically, when the step density is low, the low-frequency component of the input signal Si is multiplied by the gain 1, and the input signal Si output from the delay unit 155$b$ is multiplied by the weight 0 (=1−g). The low-frequency component of the input signal Si is thereby output as the output signal So, and the smooth output signal is generated. As a result, it is possible to effectively remove the false contour.

When the step density becomes high, the low-frequency component of the input signal Si is multiplied by the gain g (<1), and the input signal Si output from the delay unit 155$b$ is multiplied by the weight 1−g (>0). The sum of (the low-frequency component of the input signal Si)×g and (the input signal Si)×(1−g) is thereby output as the output signal So, and the steeper output signal is generated as the gain g becomes closer to 0. As a result, it is possible to remove the false contour as well as removing the high-frequency component without causing blurring of a target.

Particularly, it is highly difficult in terms of hardware configuration and takes high costs to create the variable tap low-pass filter 135. In this embodiment, the degree of steepness or slowness of the output signal is adjusted by the value of the gain g by using the variable gain low-pass filter 155 that can be implemented by hardware or software in place of the variable tap low-pass filter 135 that can be implemented only by hardware. It is thereby possible to effectively remove the false contour in accordance with the image as well as simplifying or generalizing the device configuration and reducing costs.

Note that, in this embodiment, the bandwidth described in the first embodiment may be detected instead of detecting the step density, and the gain g may be calculated based on the detected bandwidth. In this case, the gain g is calculated in such a way that the gain is closer to 1 as the bandwidth is larger.

Fifth Embodiment

Figure 15:
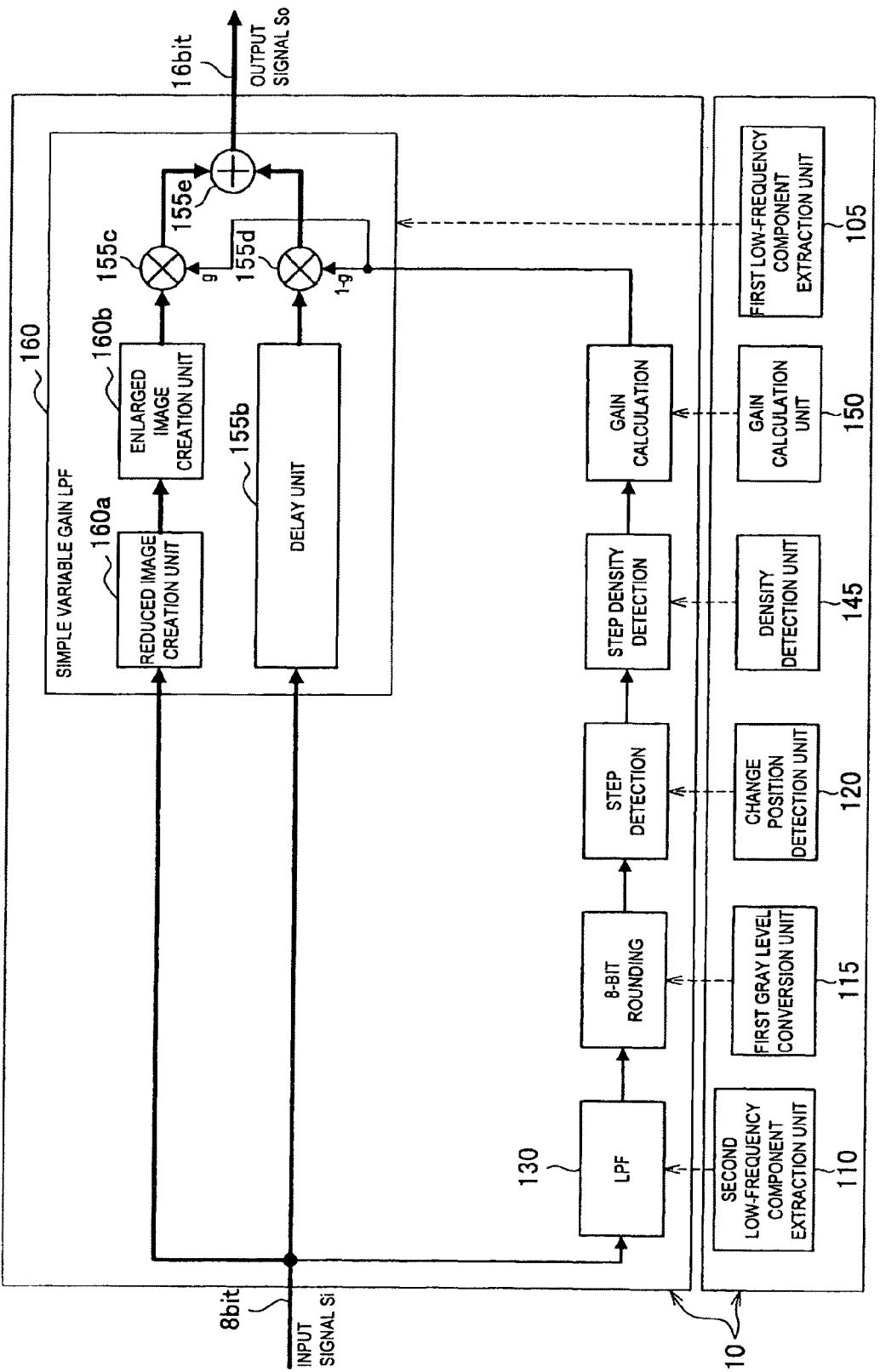
FIG. 15 is a view showing a functional configuration and an operation of a signal processing device according to a fifth embodiment of the present invention.

A signal processing device according to a fifth embodiment of the present invention is described hereinafter with reference to the functional configuration of the signal processing device shown in the lower part of FIG. 15 and the signal processing method shown in the upper part of FIG. 15.

[Functional Configuration of Signal Processing Device and Signal Processing Method]

The signal processing device 10 according to the fifth embodiment has functions indicated by the functional blocks of the first low-frequency component extraction unit 105, the second low-frequency component extraction unit 110, the first gray level conversion unit 115, the change position detection unit 120, the density detection unit 145 and the gain calculation unit 150. In this embodiment also, a CPU, not shown, reads and executes each program from memory, not shown, to thereby implement the functions of the first low-frequency component extraction unit 105, the second low-frequency component extraction unit 110, the first gray level conversion unit 115, the change position detection unit 120, the density detection unit 145, and the gain calculation unit 150.

A method of calculating the gain g by the gain calculation unit 150 is the same as that described in the fourth embodiment.

The first low-frequency component extraction unit 105 applies the gain g for weighting to the low-frequency component of the input signal Si by using a simple variable gain low-pass filter 160. The simple variable gain low-pass filter 160 includes a reduced image creation unit 160$a$ and an enlarged image creation unit 160$b$, which can be implemented by hardware or software, in place of the low-pass filter 155$a$ in the fourth embodiment. The other component parts (the delay unit 155$b$, the multiplier 155$c$, the multiplier 155$d$ and the adder 155$e$) included in the simple variable gain low-pass filter 160 are the same as those of the variable gain low-pass filter 155 in the fourth embodiment.

The reduced image creation unit 160$a$ creates a reduced image from one frame of two-dimensional data of the input signal Si. By reducing the image, the number of pixels of the two-dimensional data of the input signal Si can be reduced.

The enlarged image creation unit 160$b$ creates an enlarged image by enlarging the reduced image created by the reduced image creation unit 160$a$. When enlarging the reduced image, a technique such as bicubic interpolation or bilinear interpolation that mixes the colors in proximities of the reduced image before enlargement is used to decide the color of one pixel after enlargement.

The delay unit 155$b$ has one frame of two-dimensional data which is original data of the reduced image (which is referred to hereinafter as the original image) in stock and outputs it with a delay in order to eliminate the delay when the reduced image creation unit 160$a$ and the enlarged image creation unit 160$b$ respectively reduce and enlarge the image.

The first low-frequency component extraction unit 105 applies the gain g to the enlarged image generated from the reduced image and also applies weight (1−g) to the original image (input signal Si) and then adds up the weighted enlarged image and the weighted original image.

Specifically, the first low-frequency component extraction unit 105 applies the gain g for weighting to the enlarged image by using the multiplier 155*c*. Further, the first low-frequency component extraction unit 105 multiplies the original image of the input signal Si output from the delay unit 155*b* with a delay of one frame by (1−g) for weighting by using the multiplier 155*d*. The adder 155*e* adds up the signals respectively weighted by the multipliers 155*c* and 155*d* and thereby generates the output signal So.

Figure 16:
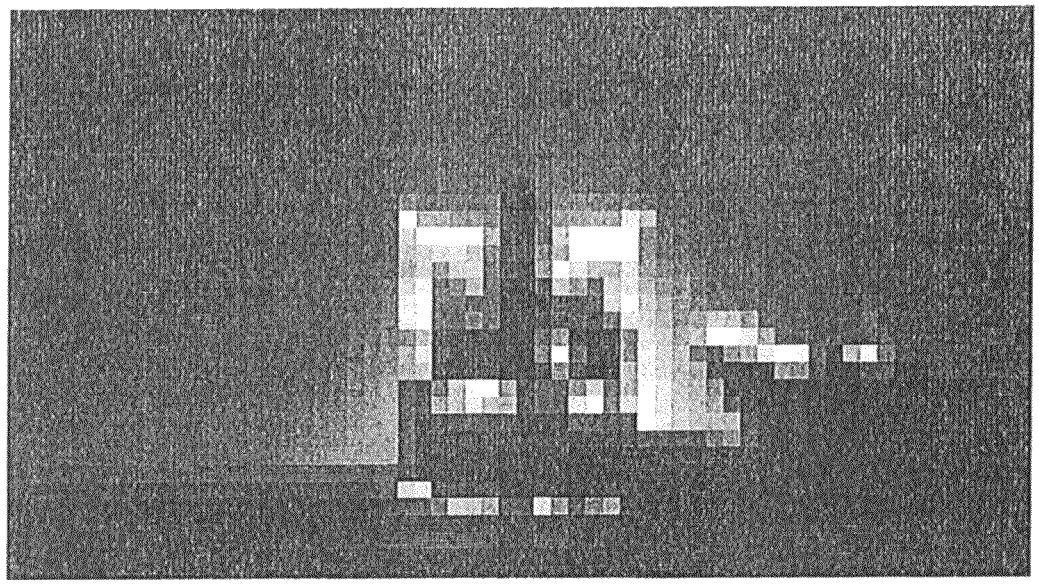
FIG. 16 shows an example of a reduced image generated by the signal processing device according to the fifth embodiment.
Figure 17:
FIG. 17 shows an example of an enlarged image generated by the signal processing device according to the fifth embodiment.

According to the embodiment, the reduced image of the input signal Si is created first. FIG. 16 shows the reduced image whose number of pixels is reduced to about 1/1000 (=1/32×1/32). Next, the enlarged image is generated by enlarging the reduced image. FIG. 17 shows the enlarged image generated by enlarging the reduced image of FIG. 16 by the bilinear interpolation.

As described above, in this embodiment, the pixel value of each pixel of the reduced image is calculated first. The number of pixels of the reduced image is smaller than the number of pixels of the original image. For example, the number of pixels of the reduced image shown in FIG. 16 is about 1/1000 of the number of pixels of the original image. Thus, the calculation amount of the pixel value of each pixel of the reduced image is about 1/1000 of the calculation amount of the pixel value of each pixel of the original image. Next, the pixel value of each pixel of the enlarged image is calculated. The pixel value of each pixel of the enlarged image is calculated based on the pixel value of each pixel of the reduced image. Thus, the calculation amount of the pixel value of each pixel of the enlarged image is also smaller than the calculation amount of the pixel value of each pixel of the original image. Note that calculating the pixel value of each pixel with a low-pass filter leads to a large calculation amount in both hardware and software and high processing load. In this embodiment, the reduced image and the enlarged image are used as a simple low-pass filter without using a low-pass filter in the simple variable gain low-pass filter 160. It is thereby possible in this embodiment to reduce the calculation amount compared to the case of using a low-pass filter to calculate the pixel value of each pixel included in the original image.

Note that, in this embodiment also, the bandwidth described in the first embodiment may be detected instead of detecting the step density, and the gain g may be calculated based on the detected bandwidth. In this case, the gain g is calculated in such a way that the gain is closer to 1 as the bandwidth is larger. However, it is preferred to calculate the step density than to calculate the bandwidth because the processing load is lower.

Sixth Embodiment

Figure 18:
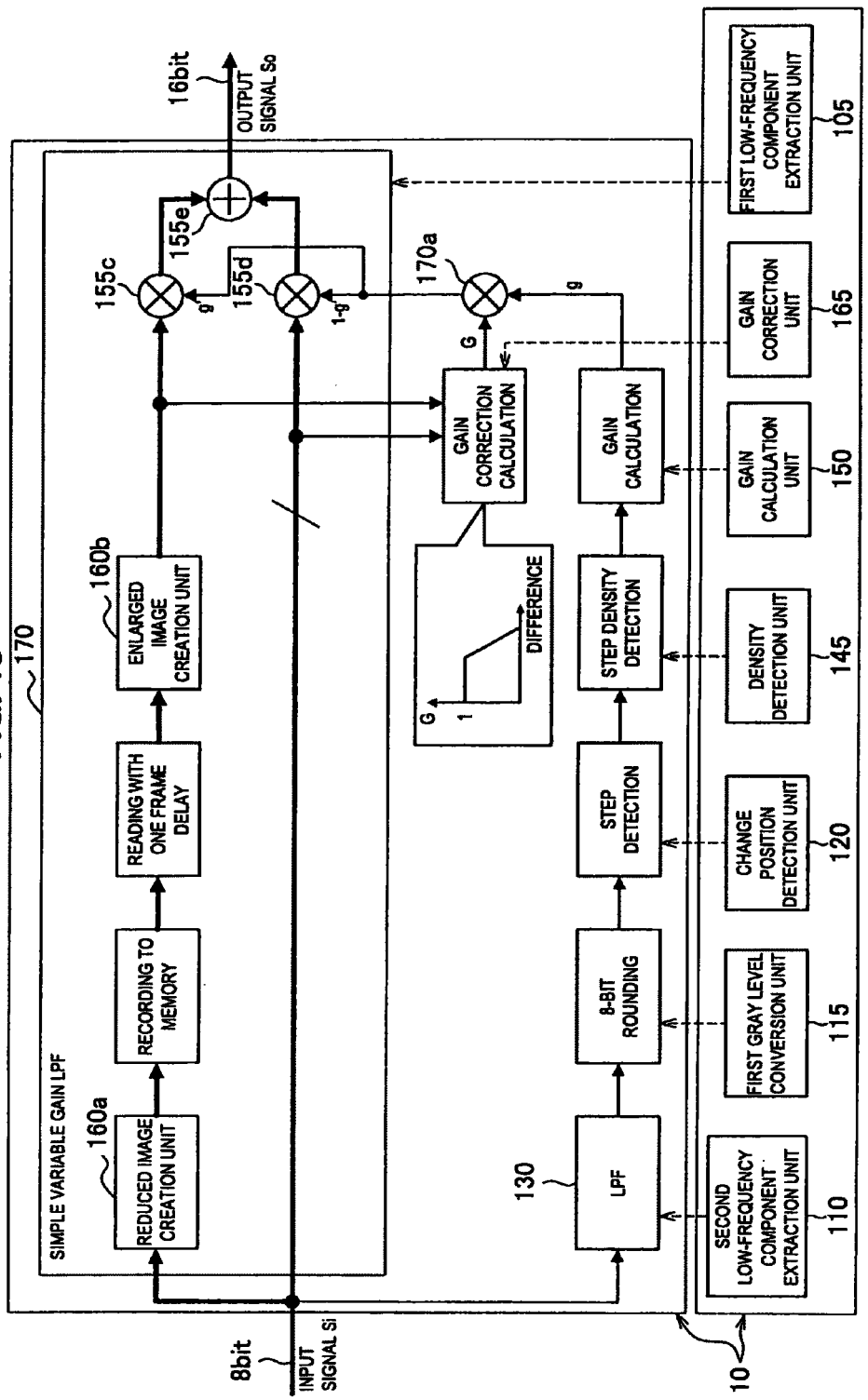
FIG. 18 is a view showing a functional configuration and an operation of a signal processing device according to a sixth embodiment of the present invention.

A signal processing device according to a sixth embodiment of the present invention is described hereinafter with reference to the functional configuration of the signal processing device shown in the lower part of FIG. 18 and the signal processing method shown in the upper part of FIG. 18.

[Functional Configuration of Signal Processing Device and Signal Processing Method]

The signal processing device 10 according to the sixth embodiment has functions indicated by the functional blocks of the first low-frequency component extraction unit 105, the second low-frequency component extraction unit 110, the first gray level conversion unit 115, the change position detection unit 120, the density detection unit 145, the gain calculation unit 150, and a gain correction unit 165. In this embodiment also, a CPU, not shown, reads and executes each program from memory, not shown, to thereby implement the functions of the first low-frequency component extraction unit 105, the second low-frequency component extraction unit 110, the first gray level conversion unit 115, the change position detection unit 120, the density detection unit 145, the gain calculation unit 150, and the gain correction unit 165.

In this embodiment, the function of the gain correction unit 165 is added. Further, the configuration of a simple variable gain low-pass filter 170 that is used by the first low-frequency component extraction unit 105 is different.

The gain correction unit 165 calculates a correction value G for correcting the gain g based on a difference between the original image and the enlarged image. Specifically, the gain correction unit 165 calculates a difference between the enlarged image created by the enlarged image creation unit 160*b* and the original image, and if the difference is small, sets the correction value G to 1. On the other hand, if the difference is large, i.e., if the difference is 1 to 2 LSB, the gain correction unit 165 sets the correction value G to a value smaller than 1. As shown in the graph of FIG. 18, the correction value G is set to a value closer to 0 as the difference is larger.

The simple variable gain low-pass filter 170 includes the reduced image creation unit 160*a*, the enlarged image creation unit 160*b*, the multiplier 155*c*, the multiplier 155*d* and the adder 155*e*.

The function that the reduced image creation unit 160*a* creates the reduced image is the same as that described in the fifth embodiment. The reduced image creation unit 160*a* records the reduced image of one frame which is created this time into a given memory area.

The enlarged image creation unit 160*b* reads the reduced image of the previous one frame which is recorded in the memory last time and creates the enlarged image from the read reduced image of the previous one frame.

As described above, in this embodiment, the reduced image of the previous one frame is used for creation of the enlarged image. Thus, the enlarged image and the reduced image, which is the original signal, have a lag of one frame. It is thus not necessary in this embodiment to delay the creation of the enlarged image until the reduced image of one frame created this time is recorded into memory.

The first low-frequency component extraction unit 105 corrects the gain g based on the correction value G calculated by the gain correction unit 165. In this embodiment, the gain g is corrected by being multiplied by the correction value G, so that a corrected gain g' is generated.

The first low-frequency component extraction unit 105 applies the corrected gain g' to the enlarged image and also applies the weight (1−g') to the original image, and then adds up the weighted enlarged image and the weighted original image.

According to the embodiment, as the difference between the enlarged image and the original image is larger, the value of the corrected gain g' becomes closer to 0, and, consequently, the enlarged image on which the false contour removal processing has been performed is cancelled, and the original image is output as the output signal So as it is. On the other hand, if the difference between the enlarged image and the original image is small, the value of the corrected gain g' is closer to 1, and consequently, the image on which the false contour removal processing has been performed is output as the output signal So, and the smooth signal from which the false contour is removed is thereby generated.

In the simple variable gain low-pass filter 160 according to the fifth embodiment, it is necessary to wait until the reduced image of one frame which is currently being processed is entirely recorded into memory in order to calculate the pixel value of each pixel of the enlarged image, which causes a large delay in processing. On the other hand, according to this embodiment, the reduced image of the previous one frame is used for creation of the enlarged image on the basis of the fact that there is generally no large difference between the images of two successive frames. It is thereby not necessary to wait until the reduced image of one frame being processed is entirely recorded into memory in order to create the enlarged image. It is thus possible to eliminate the delay and achieve high-speed processing of the video signal and further enhance the memory utilization ratio. This eliminates the need to place high capacity memory in the device, thereby enabling reduction of the hardware size as well as accurately executing the removal of the false contour.

Further, in this embodiment; the gain correction unit 165 is placed so as to output the original image and cancel the false contour removal processing by using the correction value G in the case where the motion is large or in the case of scene change, thereby preventing degradation of the output image.

Note that, in this embodiment also, the bandwidth described in the first embodiment may be detected instead of detecting the step density, and the gain g may be calculated based on the detected bandwidth.

As described above, according to the embodiments described above, by applying various kinds of low-pass filters and rounding to a digital video signal, it is possible to accurately detect the false contour containing the false contour noise S. Further, by using the detection result, it is possible to generate a smooth signal with no blurring of an image as well as cleanly removing the false contour.

In the above embodiments, the operations of the respective units are related to each other and may be replaced with a series of operations or a series of processing in consideration of the relation to each other. The embodiment of the signal processing device can be thereby converted into an embodiment of a signal processing method and an embodiment of a program for causing a computer to implement the functions of the signal processing device.

Therefore, there can be provided a signal processing method including the steps of detecting stepwise change positions of an n-bit quantized signal generated from an input signal, calculating a value indicating a degree of density of the stepwise change positions detected in the step of detecting change positions, and extracting a desired low-frequency component from the input signal based on the value indicating the degree of density of the change positions calculated in the step of calculating a density.

Further, there can be also provided a program causing a computer to execute a process including change position detection processing that detects stepwise change positions of an n-bit quantized signal generated from an input signal, density detection processing that calculates a value indicating a degree of density of the stepwise change positions detected by the change position detection processing, and first low-frequency component extraction processing that extracts a desired low-frequency component from the input signal based on the value indicating the degree of density of the change positions calculated by the density detection processing.

Furthermore, the signal processing device 10 may be incorporated into a reproducing device such as a DVD device or a Blu-ray device, so that the output signal So from the signal processing device 10 may be reproduced in a reproducing unit (not shown) included in the device. There can be thereby provided a reproducing device including a change position detection unit that detects stepwise change positions of an n-bit quantized signal generated from an input signal, a density detection unit that calculates a value indicating a degree of density of the stepwise change positions detected by the change position detection unit, a first low-frequency component extraction unit that extracts a desired low-frequency component from the input signal based on the value indicating the degree of density of the change positions calculated by the density detection unit, and a reproducing unit that reproduces a signal having the desired low-frequency component extracted by the first low-frequency component extraction unit.

It should be understood by those skilled in the art that various modifications, combinations, sub-combinations and alterations may occur depending on design requirements and other factors insofar as they are within the scope of the appended claims or the equivalents thereof.

For example, although the case of extending an 8-bit signal to a 16-bit signal is mainly described by way of illustration in the above embodiments, the signal processing executed in the present invention is not limited thereto, and it is applicable to the case of extending a 7-bit signal to an 11-bit signal or the like, and further applicable to the case of extending a $2^n$-bit signal to a $2^m$-bit (n<m) signal or the like, for example.

Further, the signal processing using a one-dimensional input signal described in the above embodiments can be extended to two-dimensional case.

Furthermore, in the signal processing according to the present invention, a low-pass filter may be prepared in a discrete manner for processing load reduction. For example, the processing load can be reduced by way of filtering through a 15-tap low-pass filter in the range where the bandwidth is 10 to 20 pixels.

Further, although the digital video signal is used as an example in the embodiments described above, the present invention may be applied to a digital audio signal or various other digital signals, not limited to the digital video signal.

What is claimed is:

1. A signal processing device comprising:
   a change position detection unit that detects stepwise change positions of an n-bit quantized signal generated from an input signal;
   a density detection unit that calculates a value indicating a degree of density of the stepwise change positions detected by the change position detection unit; and
   a first low-frequency component extraction unit that extracts a desired low-frequency component from the input signal based on the value indicating the degree of density of the change positions calculated by the density detection unit,
   wherein the first low-frequency component extraction unit changes the low-frequency component of the input signal to be extracted through a low-pass filter with a variable number of taps by varying the number of taps according to the value indicating the degree of density of the change positions, wherein a same number of taps is set for a range corresponding to a sequence of the stepwise change positions for which intervals between the stepwise change positions of the sequence are the same.

2. The signal processing device according to claim 1, further comprising:
   the low-pass filter with the variable number of taps.

3. The signal processing device according to claim 1, further comprising:
   a second low-frequency component extraction unit that extracts a low-frequency component of the input signal; and
   a first gray level conversion unit that generates the n-bit quantized signal from the input signal by converting a gray level of the low-frequency component of the input signal extracted by the second low-frequency component extraction unit,
   wherein
   the change position detection unit detects stepwise change positions of the n-bit quantized signal generated by the first gray level conversion unit.

4. The signal processing device according to claim 1, wherein
   the density detection unit calculates a bandwidth being an interval between the change positions as the value indicating the degree of density of the change positions.

5. The signal processing device according to claim 1, further comprising:
   a second gray level conversion unit that converts a gray level of the input signal from which the low-frequency component is extracted by the first low-frequency component extraction unit to a lower level with use of SBM (Super Bit Mapping).

6. The signal processing device according to claim 1, wherein
   the density detection unit calculates a step density as the value indicating the degree of density of the change positions.

7. The signal processing device according to claim 6, further comprising:
   a gain calculation unit that calculates a gain g based on the step density calculated by the density detection unit,
   wherein
   the first low-frequency component extraction unit applies the gain g calculated by the gain calculation unit for weighting to the low-frequency component of the input signal.

8. The signal processing device according to claim 7, wherein
   the first low-frequency component extraction unit applies a value obtained by subtracting the gain g from 1 (1−g) for weighting to the input signal and adds the weighted input signal to the low-frequency component of the input signal weighted by the gain g.

9. The signal processing device according to claim 6, further comprising:
   a gain calculation unit that calculates a gain g based on the step density calculated by the density detection unit;
   a reduced image creation unit that creates a reduced image by reducing an original image created from the input signal; and
   an enlarged image creation unit that creates an enlarged image by enlarging the reduced image created by the reduced image creation unit,
   wherein
   the first low-frequency component extraction unit applies the gain g calculated by the gain calculation unit for weighting to a signal forming the enlarged image.

10. The signal processing device according to claim 9, wherein
    the first low-frequency component extraction unit applies the gain g for weighting to the enlarged image and applies a weight (1−g) for weighting to the original image, and adds up the weighted enlarged image and the weighted original image.

11. The signal processing device according to claim 9, wherein
    the enlarged image creation unit creates the enlarged image from the reduced image of previous one frame created by the reduced image creation unit.

12. The signal processing device according to claim 11, further comprising:
    a gain correction unit that calculates a correction value G of the gain g from a difference between the original image and the enlarged image,
    wherein
    the first low-frequency component extraction unit corrects the gain g based on the correction value G calculated by the gain correction unit.

13. A reproducing device comprising:
    a change position detection unit that detects stepwise change positions of an n-bit quantized signal generated from an input signal;
    a density detection unit that calculates a value indicating a degree of density of the stepwise change positions detected by the change position detection unit;
    a first low-frequency component extraction unit that extracts a signal having a desired low-frequency component from the input signal based on the value indicating the degree of density of the change positions calculated by the density detection unit,
    wherein the first low-frequency component extraction unit changes the low-frequency component of the input signal to be extracted through a low-pass filter with a variable number of taps by varying the number of taps according to the value indicating the degree of density of the change positions, wherein a same number of taps is set for a range corresponding to a sequence of the stepwise change positions for which intervals between the stepwise change positions of the sequence are the same; and
    a reproducing unit that reproduces the signal having the desired low-frequency component extracted by the first low-frequency component extraction unit.

14. A signal processing method comprising the steps of:
    detecting stepwise change positions of an n-bit quantized signal generated from an input signal;
    calculating a value indicating a degree of density of the stepwise change positions detected in the step of detecting change positions; and
    extracting a desired low-frequency component from the input signal based on the value indicating the degree of density of the change positions calculated in the step of calculating a density, wherein the low-frequency component of the input signal to be extracted through a low-pass filter with a variable number of taps is changed by varying the number of taps according to the value indicating the degree of density of the change positions, wherein a same number of taps is set for a range corresponding to a sequence of the stepwise change positions for which intervals between the stepwise change positions of the sequence are the same.

15. A non-transitory recording medium on which is recorded a program causing a computer to execute a process comprising:
    change position detection processing that detects stepwise change positions of an n-bit quantized signal generated from an input signal;

density detection processing that calculates a value indicating a degree of density of the stepwise change positions detected by the change position detection processing; and first low-frequency component extraction processing that extracts a desired low-frequency component from the input signal based on the value indicating the degree of density of the change positions calculated by the density detection processing, wherein the low-frequency component of the input signal to be extracted through a low-pass filter with a variable number of taps is changed by varying the number of taps according to the value indicating the degree of density of the change positions, wherein a same number of taps is set for a range corresponding to a sequence of the stepwise change positions for which intervals between the stepwise change positions of the sequence are the same.

* * * * *